United States Patent [19]
Shiobara

[11] Patent Number: 5,602,852
[45] Date of Patent: Feb. 11, 1997

[54] DATA COMMUNICATIONS SYSTEM USING A FIBER DISTRIBUTED DATA EXCHANGE INTERFACE

[75] Inventor: Yasuhisa Shiobara, Hoya, Japan

[73] Assignee: Kabushiki Kaisha Toshiba, Kawasaki, Japan

[21] Appl. No.: 258,366

[22] Filed: Jun. 10, 1994

Related U.S. Application Data

[63] Continuation of Ser. No. 943,142, Sep. 10, 1992, abandoned, which is a continuation of Ser. No. 552,085, Jul. 13, 1990, abandoned.

[30] Foreign Application Priority Data

Jul. 13, 1989 [JP] Japan .................................. 1-181404

[51] Int. Cl.⁶ .................................................. H04L 12/433
[52] U.S. Cl. ........................................ 370/455; 340/825.5
[58] Field of Search ............................... 370/85.1, 85.4, 370/85.5, 85.6, 85.12, 85.15, 91, 94.1, 94.2, 92, 93, 94.3, 84; 340/825.05, 825.5, 825.51, 825.52

[56] References Cited

U.S. PATENT DOCUMENTS

| | | | |
|---|---|---|---|
| 4,404,557 | 9/1983 | Grow | 370/85.5 |
| 4,454,508 | 6/1984 | Grow | 370/85.5 |
| 4,459,588 | 7/1984 | Grow | 370/85.5 |
| 4,549,291 | 10/1985 | Renoulin et al. | 370/85.5 |
| 4,680,757 | 7/1987 | Murakami et al. | 370/85.4 |
| 4,866,704 | 9/1989 | Bergman | 370/4 |
| 4,926,641 | 5/1990 | Ciolon et al. | 370/85.5 |
| 4,930,121 | 5/1990 | Shiobara | 370/85.6 |
| 4,979,167 | 12/1990 | McCool | 370/85.5 |

FOREIGN PATENT DOCUMENTS

| | | | |
|---|---|---|---|
| 0150084 | 7/1985 | European Pat. Off. . | |
| 0354572 | 2/1990 | European Pat. Off. | 370/85.5 |

OTHER PUBLICATIONS

"A Timed Token Protocol For Local Area Networks", R. Grow, IEEE Electro Paper, vol. 7, May 1982 pp. 1–7.
"The Fibre Distributed Data Interface (FDDI) –A New Generation Standard For Local Area Networks" T. King, Eurocon '88, 8th European Conference on Electrotechnics, Stockholm, Jul. 1988, pp. 239–242.

*Primary Examiner*—Hassan Kizou
*Attorney, Agent, or Firm*—Foley & Lardner

[57] ABSTRACT

A data communications system has nodes provided with data processing apparatus disposed at a number of points which are mutually separated at a distance with optical transmission cables and which are provided with a FDDI (fiber distributed data exchange interface) for optical local area networks for transmitting/receiving at either high-speed or low-speed, data between the data processing apparatus, control apparatus and peripheral apparatus.

7 Claims, 4 Drawing Sheets

DATA COMMUNICATIONS SYSTEM USING A FIBER DISTRIBUTED DATA EXCHANGE INTERFACE

This application is a continuation of application Ser. No. 07/943,142, filed Sep. 10, 1992, now abandoned; which is a continuation of application Ser. No. 07/552,085, filed Jul. 13, 1990, now abandoned.

BACKGROUND OF THE INVENTION

The present invention relates to data communications systems, and more particularly, to a data processing apparatus comprising nodes provided to the data processing apparatus or to a peripheral apparatus and disposed at a plural number of points which are mutually separated by a certain distance, and optical transmission cables connecting those control apparatus, and provided with a fiber distributed data exchange interface (hereinafter termed an FDDI) that can be used for optical local area networks to transmit/receive, at either high speed or low speed, various types of data between the processing apparatus and/or control apparatus, and the peripheral apparatus.

In recent years, local area networks (hereinafter, termed LAN) have been used at an increasing rate in many different fields. Amongst these fields, one that is attracting much attention in the field of next generation, high-speed and wide-area LAN are fiber distributed data exchange interfaces for which standardization has been defined by the American National Standards Institute (hereinafter, termed ANSI-FDDI). These ANSI-FDDI use optical fiber as the transmission path and are 100 Mbps ring-shaped LAN that use the token passing method as the transmission control method. Although the ANSI has practically completed the standardization of the FDDI ratings, FDDI are being studied in the fields of the computers and communications industry since large-scale integrated circuits (hereinafter, termed LSI) and protocol processing software in conformity with the FDDI ratings have come to be available from semiconductor manufacturers.

For example, one proposal for the use of FDDI is to configure a packet exchange network so that data can be both sent and received at high speeds between multiple mainframe computers, between mass storage systems connected to mainframe computers, or connected between mainframe computers and other peripheral equipment. Furthermore, these FDDI are thought to be capable of being used as backbone networks connecting between LAN systems such as the Ethernet and MAP (manufacturing automation protocol) systems and the like.

MAP is a communications protocol for the automization of factories and is the practical standard for LAN for factory automation purposes (known as FA-LAN). LAN using FDDI having a plural number of nodes mutually connected in a ring shape generally have various functions, such as transmission path control functions, that can stop transmission requests from each node, in accordance with the transmission region that can be used by the network and acquire transmission path usage rights, transmission and receive function for the data from each node, transmission system obstruction detection functions, obstruction portion separation functions, and transmission system reconfiguration functions, etc.

As has been described above, in token-passing LAN used for LAN having FDDI, transmission rights known as tokens are successively received between each of the nodes in the system to prevent a plural number of nodes from sending at the same time. These systems are configured so that data can be sent within a predetermined set time, by those nodes that have received tokens. Accordingly, it is possible to have definitive transmission path access and so this token passing method is used in MAP systems that require realtime control.

MAP systems are one typical use of the token passing method and these systems have arranged on a factory floor for example, a computer (C), a programmable controller (PC), robots, computerized numerical control process machines (CNC) and other types of intelligent equipment configured into a network so that it is possible to achieve factory automation (FA) through the exchange between these items of equipment, of various types of data such as production management information, maintenance management information, control information, manufacturing performance information and the like. However, along with the further development of networks of intelligent equipment, factory automation has come to be unified with continuous process automation (PA) that has its own, different characteristics, to therefore give rise to the need to develop unified control systems operating under a single control LAN, and that are applicable to entire factories. These PA systems network the computers that monitor the manufacturing and that manage production, the programmable controllers (PC) that perform continuous and high-speed control of mainly equipment, and digital instrument control systems (DCS) that control instruments, etc., so that the unification of the control processes is promoted by enabling distributed control.

However, in such unified control systems including the PA systems described above, there is the problem that it is required to have realtime data exchange which is far more accurate when compared to that which is possible by FA systems alone. The reason for this is that in the case of continuous process control, the data that should be sent must be controlled so that there is a responsiveness in the order of several milliseconds. (In the case of factory automation alone, the response time of the data transmission functions required of the programmable controllers (PC) described above, is sufficient if it is in the range of several hundreds of milliseconds to several seconds.)

Furthermore, in control systems that are unified with PA, amongst the data that is exchanged between equipment is not only data which has an extremely high degree of urgency necessary for each PC control cycle of the programmable controllers and which is in units of several milliseconds, but also data for the previously described DCS operation and data for alarm and monitoring which are in units of several hundreds of milliseconds, instrument data and data for program downloading which is given background processing, or data for production management, maintenance management and manufacturing performance and the like, all of which have a relatively low degree of urgency. In such unified control systems as described above, it is required to have a network that can give a high priority to the transmission of data that has a high degree of urgency and at the same time perform the definite transmission of data that has a low degree of urgency.

In this manner, the data that is passed between the computers, programmable controllers (PC), digital instrument control systems (DCS) and other equipment connected in process control system LAN, is that which is generated in accordance with sudden transmission requests, and that which is always generated periodically in accordance with its degree of urgency as described above. Accordingly, it is therefore necessary for each node to have cyclic transmission control within a certain time period in accordance with the degree of urgency for the data of each level, and each of the items of equipment must be able to receive and renew the contents of the data for each of the received cycles. It is also necessary that the data be sent and output to the LAN so that it has priority over data with lower levels of priority (i.e. less urgency).

SUMMARY OF THE INVENTION

An object of the present invention is to provide a compact data transmission apparatus that uses FDDI as the powerful standard for next-generation high-speed and wide-area LAN, and that can perform transmission and receive control in accordance with transmission requests corresponding to a degree of urgency of low-speed data and high-speed data and without losing the excellent definiteness, self-recovery and extendability that FDDI originally had, and which is also provided with enhanced functions and performance.

In order to attain the objective described above, in a data communications apparatus in which data processing apparatus having fiber distributed data interfaces provided with processing functions for synchronous services and asynchronous services, disposed at each node, and in which these nodes are connected via transmission paths into a ring shape and transmit and receive data, the data communications apparatus relating to the present invention is configured from, a data processing apparatus for each of the nodes is configured from transmission processors that process the transmission control of the data, transceivers that perform the sending or receiving of data from said transmission path, a completion detection circuit that detects the transmission completion for own-station data or receive completion for data on the transmission path, a timer circuit that gives the timing of the data transmission cycle to the transmission processor, a dual-port memory that temporarily stores the data received from the transceiver, a common memory that stores this data to a corresponding memory address on the basis of the address in the data which is the object of transmission or receive, a direct memory access circuit that transmits the received data stored in the dual port memory circuit to the common memory, and a control circuit that classifies the data that has been renewed between the equipment connected to the data processing apparatus of each of the nodes, into a plural number of levels in accordance with its degree of urgency, allocates it as data having a unique address on the common memory set so as to have shared address for each of the data processing apparatus, sets a plural number of shared renewed cycles in each of the data processing apparatus and corresponding to the data of the plural number of levels, makes relationships between these renewed cycles and the processing functions for the synchronous services and the asynchronous services, and controls the transmission of data so that the renewed cycles that are related to the synchronous services and the asynchronous services are the time cycles corresponding to the data of each of the levels.

According to the data transmission apparatus of the present invention and as has been described above, data is automatically read from the common memories provided internally to each of the nodes, and multicast communications are performed cyclically and in accordance with the level of priority of the data. In this case, the data that is transferred between the host equipment connected to the LAN, is classified into data of the H (high-speed) level and the M (low-speed) level in accordance with its degree of urgency, and with respect to this data, the addresses that are shared by the data processing apparatus of all of the nodes are allocated as data having unique addresses on the common memory. Furthermore, renewal cycles that are shared by the data processing apparatus of all of the nodes corresponding to each level, are set as one of two types. Here, the control circuit relates the data that is to be processed, to either of the two types of transmission service functions that are provided as FDDI functions. This is to say that the data of the H level, is sent as synchronous frames by synchronous service, and the data of the M level is sent using asynchronous frames by the asynchronous service so that transmission is controlled by time cycles corresponding to each level.

This is to say that when the total data amounts Dh and Dm, and the renewal cycles Th and Tm are set so as to respectively correspond to the H level and the M level, the Dh portion of the data is always transmitted on the LAN for each renewal cycle Th, and the Dm portion of the data is transmitted for the renewal cycles Tm. When this is performed, the control circuit performs transmission control so that all of the H-level data that is to be exchanged within the process control system etc., is transmitted during the renewal cycles Th, and so that the M-level data is suitably transmitted using the time within the renewal cycles Tm. The asynchronous service allocates the M-level data transmission bands within the renewal cycle and the M-level data is then transmitted.

The common memory described above is provided as hardware to the data processing apparatus of all of the nodes and has the configuration of the present invention. Accordingly, the data processing apparatus of all of the nodes simultaneously receives the multicast communication data sent by the data processing apparatus of all of the nodes, and the data that is received from the common memory address information that is set in those data frames is stored in the specified common memory, and by this the data processing apparatus of each of the nodes has the contents of the data sent from each piece of host equipment connected to the data processing apparatus of each of the nodes can be renewed by the respective common memories. In addition, this renewal cycle is performed for each renewal cycle set for each level set as described above and so each of the pieces of host equipment can immediately read the data for information exchange on the LAN by accessing the data of the predetermined address of the common memory of the processing apparatus. Furthermore, the data processing apparatus having the configuration described above in all of the nodes has the same shared data because of the common memory so that it is possible to use the data easily and at any time.

As has been described above, according to the data communications apparatus relating to the present invention, the data processing apparatus provided at each of the nodes divides the data of each level and that is received between the host equipment such as computers, programmable controllers, digital instrument control systems and other equipment that can be connected to the each of the types of LAN such as FA and PA, and the like, into data that is always generated at a certain fixed cycle, and data that has a high degree of urgency such as transmission requests that are generated suddenly. Regarding the data that is always generated at a certain fixed cycle, the processing apparatus of each of the nodes uses multicast communications to perform cyclic transmission control of the data of each level within a certain time that is respectively set in accordance with the degree of urgency of that data. Each piece of host equipment receives the data that is sent from each of the nodes, and takes, renews or uses the contents of that data for each cycle.

In accordance with the degree of urgency of that level of data, the processing speed for the data that is sent from the node is set to one of several speeds from high speed to low speed. The data for high-speed processing is sent to the network transmission path at a higher priority than the data for low-speed processing and so it is possible to perform transmission control of the high-speed data and the low-speed data in accordance with transmission requests corresponding to the degree of urgency, and it is also possible to use marketed microprocessors or general LSIs for controlling transmission in order to perform data transmission control. In addition, an FDDI is used and so there is no loss of the excellent characteristics of definiteness, self recovery and extendability which FDDI are known for.

Still furthermore, all of the nodes simultaneously receive the data multicast communications data frames that are sent from each node and of the address information that is set in those data frames, the received data is stored in the specified common memory so that the contents of the data that is sent from each node, that is to say, from each of the host equipment connected, can be renewed in the previously described common memory in accordance with the time cycle that has been set for each level. Accordingly, each of the host equipment accesses only that data having the predetermined address in this common memory and so it is possible to immediately read the information exchange data on the network so that as a result, all of the nodes share the same data and that data can be easily used at any time.

BRIEF DESCRIPTION OF THE DRAWINGS

In the appended drawings.

DETAILED DESCRIPTION OF THE PREFERRED EMBODIMENTS

The following is a description of preferred embodiments of the present invention, with reference to the appended drawings.

First is a description of the outline of an FDDI. LAN using FDDI have two types of services: a synchronous service and an asynchronous service. When a token is received from a node, the synchronous service can send the received token and a synchronous frame at any time. On the other hand, with the asynchronous service, the nodes can send an asynchronous frame that is not synchronized with the receipt of the token only when the tokens are circulating sufficiently quickly.

Figure 1:
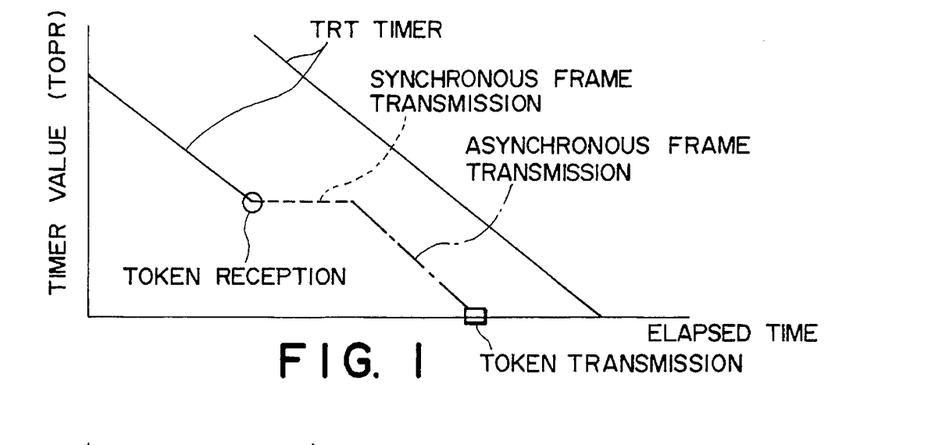
FIG. 1 is a characteristics diagram indicating the transmission timing of the tokens and the transmission of the synchronous frame for the data that is transferred by the data processing apparatus of the present invention.
Figure 2:
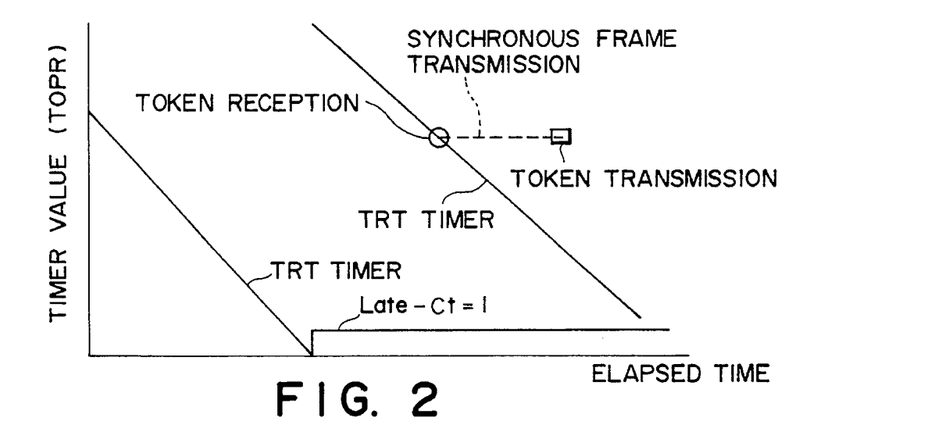
FIG. 2 is a characteristics diagram indicating the transmission timing of the tokens and the transmission of the asynchronous frame for the data that is transferred by the data processing apparatus of the present invention.

This is described as one example of the token transmission timing and the transmission of the synchronous frame and the asynchronous frame, with reference to FIG. 1 and FIG. 2. Normally, one portion of the initialization process for ring-shaped LAN using FDDI, has each of the nodes set to target token rotation times (hereinafter, termed TTRT) in order to determine the target time that it takes a token to go around the ring-shaped LAN. This value for the TTRT is the minimum value (hereinafter, termed TOPR -minimum time for operation-) for the speed from values that have been requested in order for each of the nodes to sufficiently support the synchronous traffic requests, and this TOPR value is set as the TTRT value in the token rotation timer (hereinafter, termed the TRT) for each of the nodes. When a time equivalent to the TOPR value set in the timer TRT described above has elapsed, that is, when the TOPR value had been decremented to "0", that value is inverted to "1" and the late counter that is disposed in each of the nodes is cleared each time a token is received. This is to say that when another token is received by a node before the TOPR value set in the timer TRT after a token has been previously received by that node is cleared, (i.e. When the late counter is "0"), the token is regarded as having arrived at the node within the target time. When a token arrives at times other than this, it is regarded as being delayed.

Here, when a token has arrived at a node within a predetermined target time, that is to say, when the token is going around sufficiently fast, the current value in the timer TRT is reset to the TOPR value and the timer TRT is restarted. When this is done, after the synchronous frame has been sent by the token receive, it is possible for the transmission of the asynchronous frame in the time equivalent to the above described current value set in the timer TRT, as can be seen by the "Asynchronous Frame Transmission" of FIG 1. The token is passed to the next node when this current value set in the timer TRT has elapsed, and when there is no asynchronous frame that is to be sent, as can be seen by the "Token Transmission" of FIG. 1. Moreover, when the token is delayed and arrives at the node after the previously described target time has elapsed, neither the timer TRT nor the late counter is reset. In this case, the transmission of only synchronous frames is permitted and the token is passed to the next node after the transmission of the synchronous frame has been completed, as can be seen in FIG. 2.

As has been described above, in LAN having FDDI, the two services of a synchronous service that sends synchronous frames, and an asynchronous service that sends asynchronous frames are performed.

Figure 3:
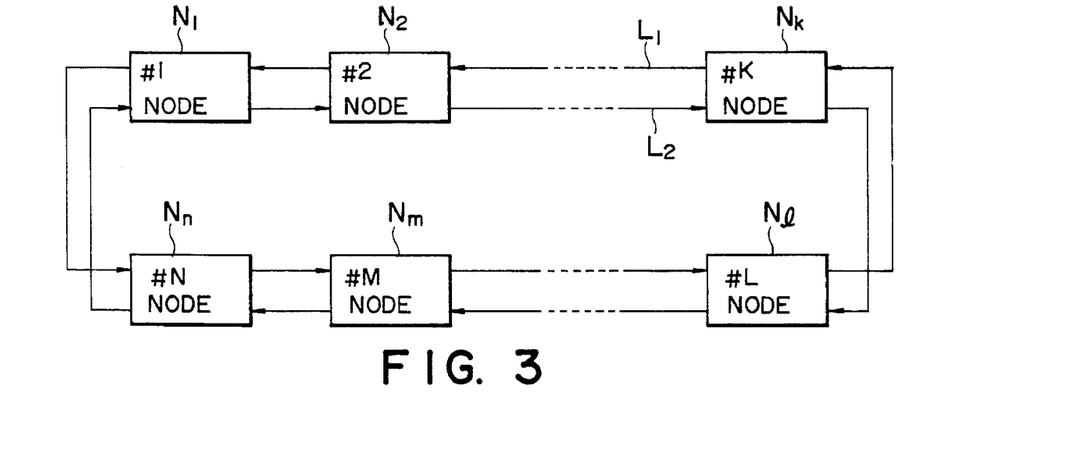
FIG. 3 is an outline diagram indicating an example configuration of a LAN system configured using the data processing apparatus of the present invention.
Figure 4:
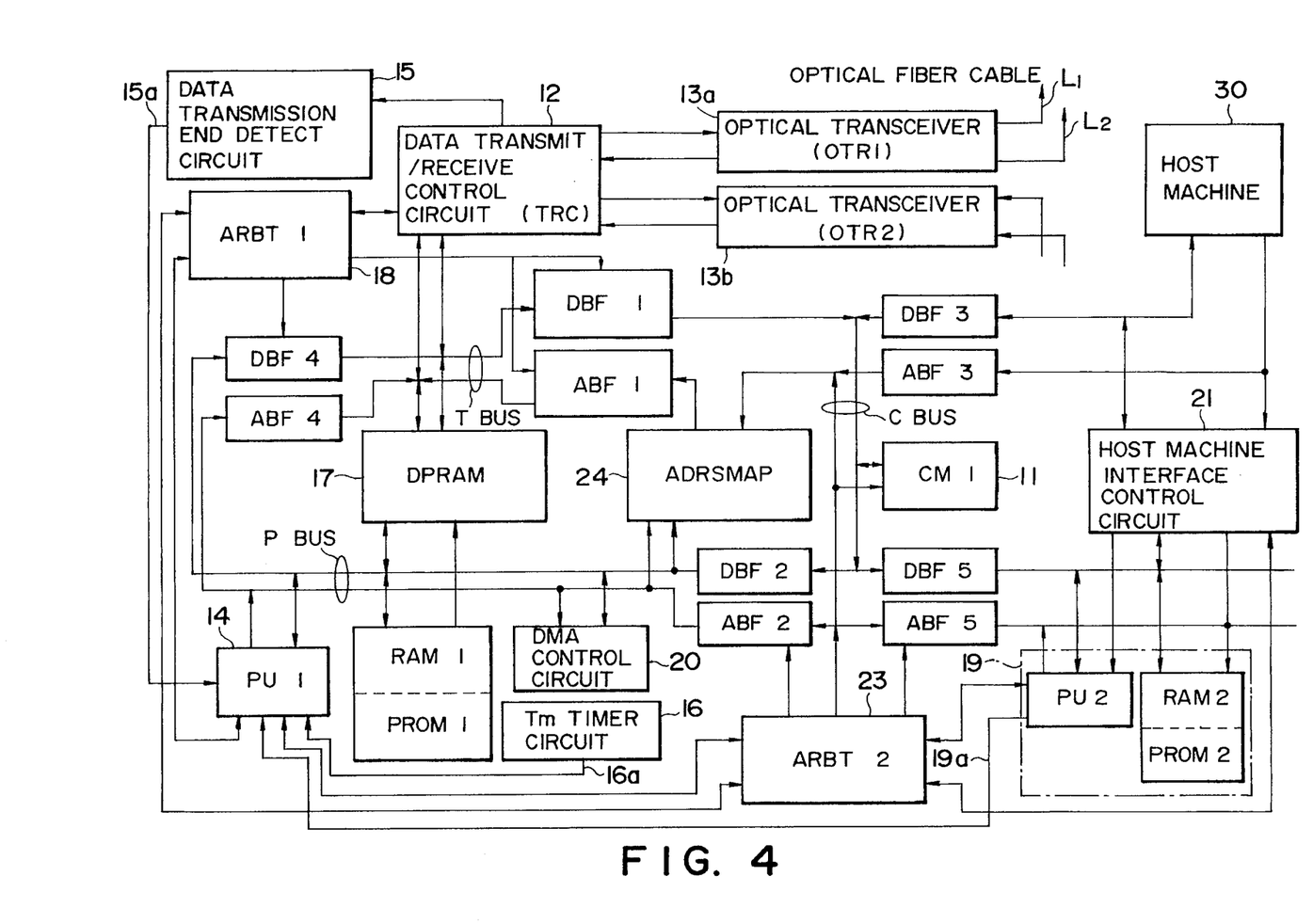
FIG. 4 is a block diagram indicating the configuration of a processing apparatus in a data processing apparatus according to a first embodiment of the present invention.

The following is a detailed description of the data communications apparatus relating to the present invention and which is applied to a LAN having the FDDI described above. As is indicated in FIG. 3, a number from #1 to #n of nodes $N_1$ through $N_n$ are mutually connected by two optical fiber cables $L_1$ and $L_2$ so that the directions of the transmission data flows oppose each other. Each of these #1 to #n nodes $N_1$ through $N_n$ are configured by a data processing apparatus 10 that controls the data transmission, and a host apparatus 30 that connects them. One example of this data processing apparatus 10 is, as indicated in FIG. 4, provided with a common memory 11, a data transmission and receiving control circuit 12, a first and a second optical transceiver 13a and 13b, a microprocessor for FDDI data transmission 14, a data transmit and receive completion detection circuit 15, a Tm timer circuit 16, a dual port memory circuit 17, a transmit and receive common memory bus scheduler circuit (arbitration circuit -ARBT1-) 18, a microcomputer circuit (configured from a PU2, a RAM2 and a PROM2) 19, a direct memory access control circuit 20, a host apparatus interface control circuit 21, a host apparatus 30, a common memory bus scheduler circuit (ARBT2) 23, an address conversion (address mapper -SMAP-) circuit 24, data bus transceivers (data buffers) DBF1, DBF2, DBF3, DBF4 and DBF5, and address bus transceivers (address buffer) ABF1, ABF2, ABF3, ABF4 and ABF5.

The data transmission and receiving control circuit 12 is a circuit that controls the transmission and receiving of data on the basis of the FDDI ratings, and this data transmission and receiving control circuit 12 is a circuit with a configuration equivalent to the Am79C81A, Am79C82A, Am79C83, Am7984A and Am7985A of the American company AMD.

The optical transceivers 13a and 13b are for the transmission and receiving of the data to the transmission path and therefore the microprocessor for FDDI data transmission 14 governs the transmission control of the present invention. The data transmit and receive completion detection circuit 15 detects the completion of receive of transmission data on the transmission path from the data transmission and receiving control circuit 12, or the completion of send of transmission data of the node itself, that is, the self station.

The Tm timer circuit 16 gives the send cycle timing for the data to the microprocessor for FDDI data transmission 14, and therefore the dual port memory circuit 17 is for the temporary storage of the received transmission data, and so when the transmit and receive memory bus scheduler circuit 18, the microprocessor for FDDI data transmission 14, the host apparatus 30, and the microcomputer circuit 19 access the dual port memory circuit 17, control is performed for the usage rights for the T-bus (i.e., transmission bus) connected to these circuits.

The microcomputer circuit 19 is provided with a microprocessor PU2, a RAM2 and a PROM2 and controls the communications procedures between the host apparatus 30 and the microprocessor for FDDI data transmission 14. The direct memory access control circuit 20 is for the DMA (direct memory access) transmission of received data stored in the dual port memory circuit 17 to the common memory 11. The host apparatus interface control circuit 21 is for the control of the interface with the host apparatus 30. The common memory bus scheduler circuit 23 performs the usage rights control for the C-bus (i.e., control-bus) that connects the data transmission and receiving control circuit 12, the direct memory access control circuit 20, the host apparatus 30, and the microcomputer circuit 19 when they access the common memory 11.

The address conversion circuit 24 generates dual port memory circuit addresses when the host apparatus 30 and the microcomputer circuit 19 access the dual port memory circuit 17 by the dual port memory through the control of the common memory bus scheduler circuit 23.

The previously described data signal transceivers DBF1 through DBF5 are provided in order to access the previously described C-bus and T-bus. The previously described address signal transceiver circuits ABF1 through ABF5 are provided to access the C-bus and the T-bus using the address signals. The P-bus is a processor bus connected to the microprocessor for FDDI data transmission 14 in order to transmit the data from the dual port memory circuit 17 to the common memory 11.

In the data communications apparatus of the present invention and having each node provided with a data processing apparatus configured as described above, the data that is received and passed between the computers (C), the programmable controllers (PC) and the digital instrument control systems (DCS) connected to the LAN, is classified and divided into levels in accordance with its urgency, and specified so as to be transmitted and output at each node within a time set with respect to it. For example, the data that is sent and output at each node is classified into data that has the two levels of the H-level (high-speed) and the M-level (low-speed) in accordance with the urgency, and then the two types of renewal cycles (i.e., data refreshing periods) Th and Tm that are shared between all nodes, are set to correspond to the two levels. (Refer to FIG. 5.)

Figure 5:
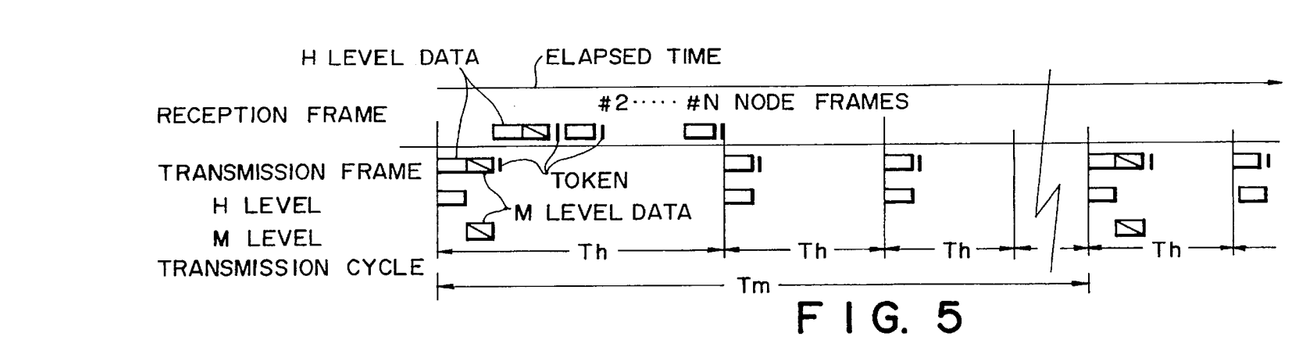
FIG. 5 is a chart indicating the transmission timing of data from the processing apparatus indicated in FIG. 4, to a transmission path.

When this is done, transmission control so that the time cycles corresponding to each level is performed, with the H-level data having a relationship set so that it is sent by the synchronous service of the FDDI functions, and the M-level data having a relationship set so that it is sent by the asynchronous service of the FDDI functions. This is to say that in the data processing apparatus described above, the data amounts corresponding to the H- and M-data levels and passing between the data processing apparatus described above are made Dh and Dm respectively, and the renewal cycles are made Th and Tm respectively and transmission control is performed so that the data processing apparatus always transmits the Dh portion of the data to the LAN for each renewal cycle Th, and transmits the Dm portion of the data for each renewal cycle Tm.

Here, in the present embodiment, so that the above described transmission control can be performed for the data, there is the following relationship made for the common renewal cycles Th (shorter cycle) and Tm (longer cycle) that are common to each of the nodes, and the time necessary for the transmission of the total data amounts Dh and Dm for all of the nodes for each level. This is to say that if the time necessary to transmit the total data amounts Dh and Dm corresponding to each level, that is to say, the time that the data holds as transmission data on the LAN, is made Tdh and Tdm corresponding to each level, then the relationship between the renewal cycle Th and Tm is as obtained from the following formulae (1) through (5). That is:

$$Tm = \Sigma Th(i) \tag{1}$$

$$Th(i) = [Tdh(i) + Tsh(i)] + [Tdm(i) + Tsm(i)] + Tv(i) \tag{2}$$

$$Tm = \sum_{i=1}^{n} [Tdh(i) + Tsh(i)] + [Tdm + Tsm] + \sum_{i=1}^{n} Tv(i) \tag{3}$$

$$Tdm = \sum_{i=1}^{n} Tdm(i) \tag{4}$$

$$Tsm = \sum_{i=1}^{n} Tsm(i) \tag{5}$$

Here, Th(i) is the actual renewal time for the i'th renewal time Th, n is the number of renewal cycles of the h level within one renewal cycle of the m level, Tsh(i) and Tsm(i) are the times necessary for the data transmission generated suddenly and corresponding to the M level and H level generated within the respective renewal times Th(i), and Tdm(i) is the time required to transmit the M-level data. In addition, Tv(i) is the vacant time for when there is no data on the fiber transmission path, and this time is determined by the number of relays of the M-level data for each of the nodes in the LAN, and by the length of the cable that forms the ring, and also by other factors.

Figure 6:
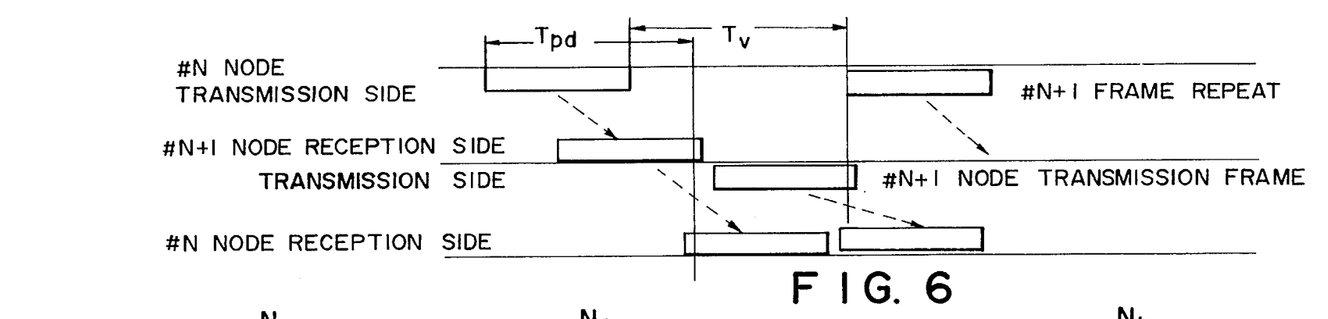
FIG. 6 is a timing chart indicating the transmission delay time determined by the system configuration of the data processing apparatus of the present invention.

The following is a description of the vacant time indicated by Tv(i). The vacant time Tv for the optical fiber transmission path is determined by the transmission delay time required for a transmitted data frame to go around the ring once, as indicated in FIG. 6. This is to say that the transmission delay time Tpd (=Tv) required to travel once around the ring becomes the sum of the relay delay when the data frame is processed and relayed by each node, and the data frame transmission delay when the data frame is transmitted around the optical fiber transmission path, and is obtained from formula (6).

$$Tv = Tpd = \sum_{j=1}^{p} [Tsd(j) + Tfb(j, j+1)] \quad (6)$$

Here, Tsd(j) is the data relay delay at node j and Tfb(j, j+1) is the data transmission delay on the optical fiber transmission path between node j and node j+1, and where p corresponds to the number of nodes.

Figure 8:
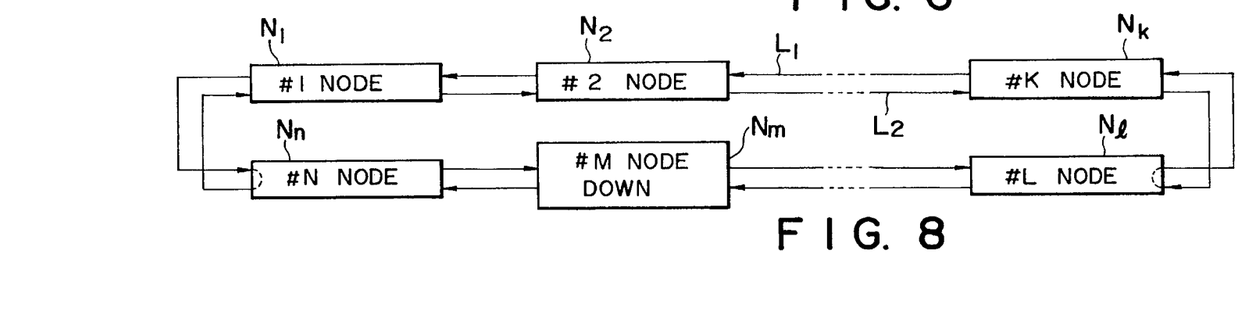
FIG. 8 is a diagram explaining the system reconfiguration function for the case where an obstruction has occurred in the LAN system indicated in FIG. 3.

Moreover, FDDI are configured so that when an abnormality occurs during operation, the portion having the obstruction #M node of FIG. 8, is separated and the remaining portions that are operating normally are used to reconfigure the system so that the functions can continue to be performed. This is to say that as indicated in FIG. 8, the nodes (#N node and #L node) that are upstream and downstream of a portion having an obstruction have their transmission paths returned so that the system is reconfigured. Accordingly, the situation when an abnormality occurs and there is a return configuration is considered and in the present embodiment, the value for the transmission delay time Tpd is doubled to twice the value necessary when there is normal operation.

Figure 7:
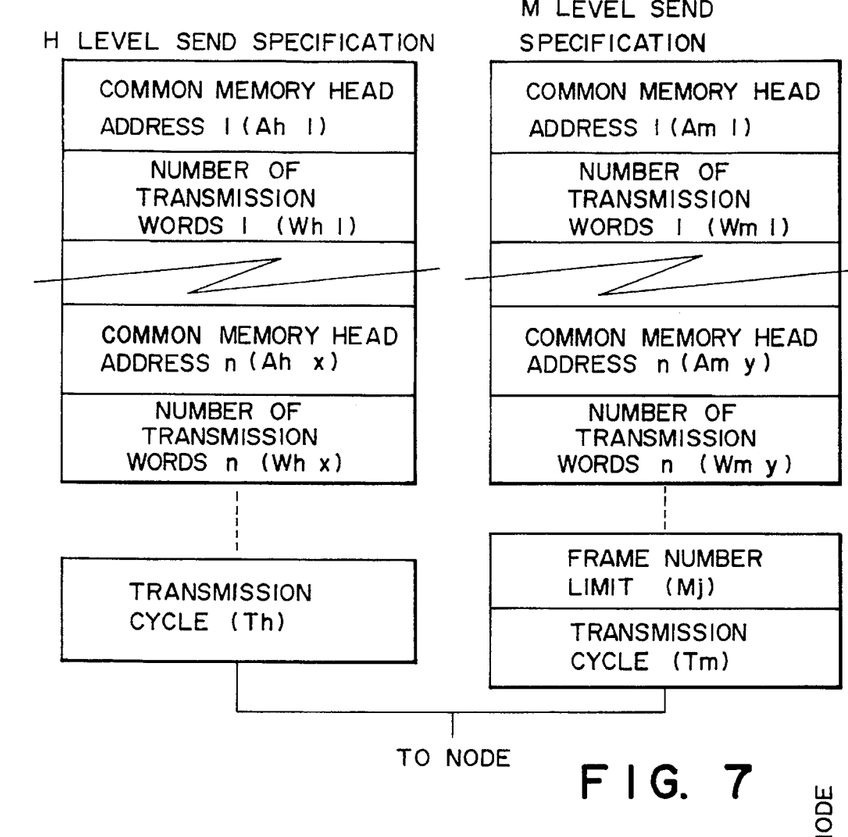
FIG. 7 is a diagram describing an example of a data transmission specification table used in the data processing apparatus of the present invention.

On the other hand, the data Dh and Dm corresponding to the two levels are each divided and transmitted by the nodes on the LAN. This is to say that as indicated in FIG. 7, at each of the nodes, the number of data words corresponding to each of the data Dh and Dm with the different levels, has a head address specified in the common memory where that data that is to be sent is stored. The common memory is set so that addresses that are shared by all of the nodes with respect to the two levels of data Dh and Dm, is allocated as data having unique addresses. In this manner, the transmission data frames are prepared and transmitted in accordance with the number of words specified by the data for the two levels. Accordingly, in the i'th renewal cycle Th, the time Tdh that the H-level data holds as transmission data on the LAN, and the time Tdm that the M-level data holds in m number of renewal cycles Th are obtained by the relationship with the transmission times Tw(wh·k) and Tw(wm·k) determined by the transmission word number and the times Tdh(j) and Tdm(j) for the sending and output of data of each level to the LAN by each of the nodes (j), as indicated by formulas (7) through (10).

$$Tdh = \sum_{j=1}^{p} Tdh(j) \quad (7)$$

$$Tdm = \sum_{j=1}^{p} Tdm(j) \quad (8)$$

$$Tdh(j) = \sum_{i=1}^{k} Tw(Whi) \quad (9)$$

$$Tdm(j) = \sum_{i=1}^{k} Tw(Wmi) \quad (10)$$

Here, the signal wh is the H-level transmission words, and the signal wm is the L-level transmission words, and k represents the respective numbers of words.

In addition, the number of transmission words of the data Dh and Dm of the H and L levels is determined by the following relationship when wdh and wdm are both set. This is to say:

$$Wdh = \sum_{j=1}^{p} \sum_{i=1}^{k} Whi \quad (11)$$

$$Wdh = \sum_{j=1}^{p} \sum_{i=1}^{k} Wmi \quad (12)$$

Furthermore, in the transmission service functions are provided as FDDI functions, that as described above, the H-level data Dh is sent using synchronous frames by the synchronous service, and the M-level data Dm is sent using asynchronous frames by the asynchronous service.

In this embodiment, the minimum value (TOPR) of the target token round time value that controls the transmission of the asynchronous frame is determined as follows.

$$TOPR = Th + \alpha \quad (13)$$

(where α is the variable surplus value, and is generally 5%)

$$Tdh \leq K \cdot Th \quad (14)$$

(where K is a load ratio, and is generally 80%)

The total number of transmitted data for the data Dh and Dm of each level is set to within the range established by formulae (1) through (4) above. This is to say that the settings described above can be said to make the target token round timer value and the parameters of the asynchronous service compatible with the renewal cycle Th of the H level.

In the embodiment described above, the above time relationships and parameter settings are used to perform transmission control so that the completion of send of the H-level data at each node and including sudden transmission request data trains for each renewal cycle by the synchronous service of the FDDI is confirmed, and the data transmission standby trains for the M-level data for the asynchronous service are reset upon the detection of time elapsed by the timer Tm provided internal to each node. (Refer to FIG. 9.)

In a data transmission apparatus having the configuration described for the embodiment above, then as has already been described, a data transmission specification table indicated in FIG. 7 is created, and that data transmission specification table is set in the common memory 11 via the optical fiber transmission path or the host apparatus connected to each node.

In this data transmission specification table there is read from the common memory 11, corresponding to the data of the H level and the M level, and the head address and the number of transmission words stored in the data that is to be sent are set. This is to say that the pairs of settings for the number of transmission words and the head address set in the common memory 11 correspond to one transmission request. In the data transmission specification table indicated in FIG. 7, these transmission requests for this node has number x for the H level and number y for the M level.

In addition, at this time, the microprocessor for FDDI data transmission 14 is read for the renewal times for the data of the H level and the M level set in the common memory 11, that is, the lower limit Mj (the value that is limited so that the data frame can be actually transmitted within the time for which transmission of the data frame is possible) for the number of transmission frames for the data of the M level and the transmission cycle Th and Tm, and this read transmission cycle Th is set as the minimum TOPR value for the target token round time value in order for the asynchronous frame transmission by asynchronous service to the data transmission and receiving control circuit 12. On the other hand, the transmission cycle Tm is set in the Tm timer circuit 16 and the timer operation of the Tm timer circuit 16 starts. This is to say that the interrupt signal 19a is sent to the microprocessor for FDDI data transmission 14 for each time the renewal cycle Tm is set.

Figure 9:
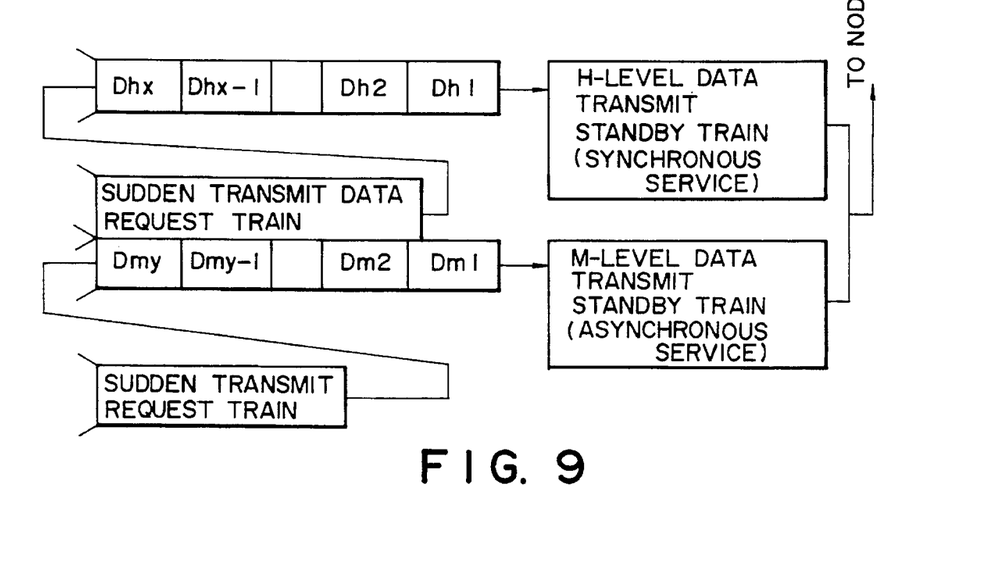
FIG. 9 is a diagram indicating one example of a data transmission standby trains for the synchronous and asynchronous services used in the data processing apparatus of the present invention.

In this manner, the data communications apparatus of the present invention has a common memory in which the data is set, inside the data processing apparatus of each node and so the microcomputer circuit 19 receives the data transmission start instructions from the host apparatus 30 via the host apparatus interface control circuit 21 by sending the interrupt signals 19a to the microprocessor for FDDI data transmission 14, to start the data transmission. In addition, when the microprocessor for FDDI data transmission 14 receives the timer time elapsed detection signal 16a from the Tm timer circuit 16, then as indicated in FIG. 9, all of the data transmission requests for the data Dm of the M level are appended again to the data transmission standby trains of the M level. In addition, all of the data Dh of the H level is appended to the transmission standby trains within the data transmission time cycle Th. This is to say that when the completion of H-level data transmission, that is, data transmission by synchronous frame using the synchronous service is detected by the data transmit and receive completion detection circuit 15, the H-level data transmission requests are again appended to the H-level data transmission standby matrix.

By performing the transmission control as has been described above, the H-level data at each of the nodes is always sent for each time cycle Th, and the M-level data is divided for each node within the time cycle Tm set by the asynchronous service of the FDDI and the target round timer value and sent at suitable times. This is to say that the M-level data is allocated transmission bands inside the time cycle Tm by the asynchronous service and within the lower limit value for the transmission frames, and sent. Accordingly, the data of each level and that passes between the computers (C), programmable controllers (PC), digital instrument control systems (DCS) and host equipment connected into a LAN for a process control system or the like, is sent at a cycle with a time unit corresponding to the urgency as has been described above, and at each node, the data of each level is sent within a time corresponding to the degree of urgency. Furthermore, at each host apparatus, the contents of the data are received and can be taken in, renewed and used for each time cycle. As a result, it is possible to have transmit and receive control in accordance with a transmission request corresponding to the urgency of high-speed data and low-speed data. Furthermore, the functions characteristic of FDDI are used and so it is possible to have enhanced functions and performance without losing any of the characteristic features of FDDI.

The following is a description of the format of a data frame which is placed on the transmission path, with reference to the table below.

TABLE

[PA][SD][FC][DA][SA]<DSAP><SSAP><C><WN><ADRS><DATA$_0$ to DATA$_n$>[FCS][ED][FS]

| | |
|---|---|
| SD, ED: | start delimiter, end delimiter |
| FC: | frame control |
| DA, SA: | destination node address, source node address |
| DSAP, SSAP: | destination service access point, source service access point |
| C: | command |
| WN: | number of words |
| ADRS: | common memory head address |
| DATA$_{0-n}$: | transmission data |
| FCS: | ANSI-CRC1 frame check sequence |
| FS: | frame status |

This table indicates an example of the format of an actual data frame that is placed on the transmission path, and relates to the data frame train of FIG. 5 that is transmitted on the transmission path by the data processing apparatus of the present invention. In this table, the start of the data frame is indicated by the preamble PA and the start delimiter SD, and then the frame control FC allows the identification of the data frame level, that is to say, whether there is a synchronous service or an asynchronous service. Then the destination node address DA and the sourced node address SA specified the node addresses in the multicase address format and the destination service access point DSAP and the source service access point SSAP and the command C specify the transmission data frame of the present invention. Moreover, the number of words WN and the common memory head address ADRS are in agreement with the set data for the number of transmission words WN and the common memory head address indicated in FIG. 7. Furthermore, the data that is to be sent is specified from DATA$_0$ to DATA$_n$ and the frame check sequence is specified by ANSI-CR32. Moreover, the end delimiter ED indicates the end of the frame and specifies the frame status for the following data frame.

Here, when a node receives a data frame on the transmission path, the received data frame is stored in the dual port memory circuit 17 by the data transmission and receiving control circuit 12 and via the optical transceivers 13a and 13b. When the microprocessor for FDDI data transmission 14 receives the receive completion detection signal 15a from the data transmit and receive completion detection circuit 15, detection is performed for whether or not there is the data frame of the present invention and the direct memory access control circuit 20 is used to transmit the received data from the dual port memory circuit 17 to the common memory 11. Accordingly, the received data is stored for a specified time cycle on the common memory 11 of the data processing apparatus of each node, and is always renewed to its newest status. As has been described in detail above, in this embodiment, there is a common memory provided as hardware in the data processing apparatus of each node and so the host apparatus connected to each node can read and use the newest data that has been renewed in the common memory irrespective of the previously described data transmission operation. In addition, writing the data to the common memory irrespective of transmission operation allows the exchange of data between nodes. Furthermore, dual port memory circuits are provided and so the received data frames can be temporarily stored and after their contents have been judged, they can be stored at predetermined addresses in the common memory which is the final place for the storage of the data. When this is performed, the storage to the common memory involves reading the data from the side of the P-bus, DMA (direct memory access) transfer, and then storing the received data from the side of the T bus at the same time as this DMA transmission, so that it is possible to effectively use the transmission performances of the T bus and the P bus.

Moreover, this receive operation is performed as certain typical processing but it is necessary for there to be continuous processing always, and because of this, the microprocessor for FDDI data transmission 14 for dedicated control of the FDDI is provided. In addition, even if there is a relative time surplus, the transmission protocol processing and the complex interface processing between the host equipment is performed by the dedicated microcomputer circuit 19 so that the load of the transmission processing is distributed. Furthermore, these microprocessors can use readily available microcomputer LSI or the like, so that it is possible to manufacture a compact and inexpensive communications apparatus.

Moreover, in the embodiment described above, the description was for the case when an optical fiber was used as the transmission path but the present invention is not limited to this, as a coaxial cable or spatial transmission can be used separately as indicated in FIG. 3 and FIG. 8 or these means can be used in conjunction with optical fiber cables.

Still furthermore, in the embodiment described above, the standby trains for the transmission requests for each node were of two types corresponding to synchronous service and asynchronous services for FDDI, but the asynchronous service standby trains can be classified into send request standby trains of the several types of M levels by software processing, and these can then be divided into levels in accordance with their degrees of urgency.

In addition, in the embodiment described above, the description was given for the timing for the resetting of the transmission request standby train occurring after the completion of transmission is detected for that node, but in the method of the present invention, it is also possible for this to be performed upon the detection of receipt from a particular node, upon receipt by the node after that node, or upon receipt from a specific node, since all of the nodes are always receiving data.

Furthermore, in the example of the configuration of a data frame of the present invention, the destination node address DA and the multicast address method are used and so in the case of this method, a multicast address that specifies the node is set for each node but it is also possible to have the transmission of data without problem even if nodes that do not use this method are also included in the transmission path.

In addition, in the embodiment described above, the received data frames are all stored in the common memory but the data processing apparatus for all of the nodes may not require all of the data received. These data processing apparatus that do not require all of the data received judge the common memory storage address that is included in the data frame by the dual port memory, at the time when the data frame is stored in the dual port memory circuit, and there can be operation so that the data transmission to the common memory is stopped when there is data not necessary for the data processing apparatus of that node. In this case, the common memory provided to the processing apparatus can have its capacity reduced, so that the amount of hardware can be reduced to have only the necessary capacities.

What is claimed is:

1. A data communication system having a plurality of nodes and a transmission path which connects said nodes in a token passing network in which each of said nodes has a data processing apparatus for transmitting data to and receiving data from said transmission path and for performing a plurality of transmission operations, said transmission operations having transmission periods, wherein said data processing apparatus comprises:

a) data control means for controlling data transmission and reception;

b) processor means, coupled to said data control means, said processor means controlling said data control means;

c) transceiver means, coupled to said data control means, said transceiver means being provided for transmitting data on said transmission path and receiving data from said transmission path based on the operation of said processor means;

d) detection means, coupled to said data control means and said processor means, for detecting data transmission-completion and data reception-completion;

e) timer means for informing said processor means of a timing which determines data transmission of said transceiver means, said data transmission periods corresponding to times during which said transceiver transmits data on said transmission path;

f) first memory means, coupled to said data control means, for temporarily storing data to be transmitted to and data received from said transmission path;

g) second memory means, coupled to said first memory means, for storing data to be transmitted and data received in accordance with address information contained in said data;

h) direct memory access controller means for controlling data transfer between said first memory means and said second memory means; and i) microcomputer means for classifying data to be transmitted according to a plurality of levels reflecting required priorities, said plurality of levels being assigned to address areas in said second memory means, and for defining said plurality of data transmission periods corresponding to said plurality of levels, wherein the length of a data transmission period corresponds to the amount of data of a corresponding level.

2. The data communication system of claim 1, wherein said microcomputer means classifies data to be transmitted into first and second levels, defines two corresponding data transmission periods, a first period and a second period shorter than said first period, and sets two speed levels of data transmission, a high-speed level and a low-speed level, said high-speed level utilized for transmitting data of the second level and said low-speed level utilized for transmitting data of the first level, and said microcomputer means further selecting a transmission time for said data processing apparatus so that the sum of the transmission time for sending said transmitting data at the high-speed level for all of said nodes is less than said first period.

3. The data communication system of claim 2, wherein said microcomputer means allocates the data to be transmitted at the low-speed level within said first period after all of the data at the high-speed level has been transmitted.

4. The data communication system of claim 3, wherein data to be transmitted within said first period is transmitted asynchronously with respect to reception of tokens.

5. A data communication method in a data communication system having a plurality of nodes and a transmission path which connects said nodes in a token passing network in which each of said nodes has a data processing apparatus for transmitting data to and receiving data from said transmission path and for performing a plurality of transmission operations, said transmission operations having transmission periods, said each of said nodes transmitting data either synchronously with respect to reception of one of a plurality of tokens which are passed between said nodes in said token passing network when said tokens are passed between said nodes at a rate faster than a predetermined time, or asynchronously with respect to reception of any of said tokens when said tokens are passed between said nodes at a rate slower than the predetermined time, said data communication method comprising the steps of:

a) classifying data to be transmitted from each of said nodes as one of high priority data and low priority data;

b) setting a first data frame for which said high priority data is to be transmitted on said token passing network for each of said nodes, said first data frame being set to a value less than the predetermined time;

c) sending said high priority data at each of said nodes synchronously with respect to reception of any one of said tokens during said first data frame;

d) setting a second data frame for which said low priority data is to be transmitted on said token passing network for each of said nodes, said second data frame being set to a integer multiple of said first data frame, said integer multiple being greater than one; and e) sending said low priority data at each of said nodes asynchronously with respect to said reception of said any one of said tokens during said second data frame only after all of said high priority data has been sent by said respective node.

6. A data communication method in a data communication system having a plurality of nodes and a transmission path which connects said nodes in a token passing network in which each of said nodes has a data processing apparatus for transmitting data to and receiving data from said transmission path and for performing a plurality of transmission operations, said transmission operations having transmission periods, said each of said nodes transmitting data either synchronously with respect to reception of one of a plurality of tokens which are passed between said nodes in said token passing network when said tokens are passed between said nodes at a rate faster than a predetermined time, or asynchronously with respect to reception of any of said tokens when said tokens are passed between said nodes at a rate slower than the predetermined time, said data communication method comprising the steps of:

a) classifying data to be transmitted from each of said nodes as one of high priority data and low priority data, said low and high priority data being data that is updated at a first rate and a second rate, respectively;

b) determining an amount of said high priority data and an amount of said low priority data generated at each of said nodes;

c) determining a first time period for sending of the amount of said high priority data and a second time period for sending of the amount of the said low priority data through said token passing network;

d) setting a first data frame for which said high priority data is to be transmitted on said token passing network for each of said nodes, said first data frame being set to a value greater than said first time period;

e) sending said high priority data at each of said nodes synchronously with respect to reception of any one of said tokens during said first data frame;

f) setting a second data frame for which said low priority data is to be transmitted on said token passing network for each of said nodes, said second data frame being set to a integer multiple of said first data frame, said integer multiple being greater than one; and g) sending said low priority data at each of said nodes asynchronously with respect to said reception of said any one of said tokens during said second data frame only after all of said high priority data has been sent by said respective node.

7. The data communication method of claim 6, further comprising the step of determining the predetermined time as a time length corresponding to the first data frame.

* * * * *